United States Patent
Nielsen et al.

(10) Patent No.: US 8,376,206 B2
(45) Date of Patent: Feb. 19, 2013

(54) COLD WELD

(75) Inventors: Christian S. Nielsen, River Falls, WI (US); Timothy T. Bomstad, Inver Grove Heights, MN (US); Anthony M. Chasensky, St. Paul, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 13/275,994

(22) Filed: Oct. 18, 2011

(65) Prior Publication Data

US 2012/0125978 A1    May 24, 2012

Related U.S. Application Data

(63) Continuation of application No. 11/215,080, filed on Aug. 30, 2005, now Pat. No. 8,038,048.

(51) Int. Cl.
    *B23K 20/00*    (2006.01)
(52) U.S. Cl. .......................... 228/3.1; 228/115
(58) Field of Classification Search .......... 228/115, 228/3.1, 47.1, 443, 213, 235.1, 212; 269/53, 269/54.1, 48.2
See application file for complete search history.

(56) References Cited

U.S. PATENT DOCUMENTS

| | | | |
|---|---|---|---|
| 2,522,408 A | 9/1950 | Sowter | |
| 3,029,666 A * | 4/1962 | Lovins | 228/1.1 |
| 3,618,843 A | 11/1971 | Hayes et al. | |
| 3,696,986 A | 10/1972 | Anderson et al. | |
| 3,724,739 A | 4/1973 | Anderson et al. | |
| 4,545,108 A | 10/1985 | Adams et al. | |
| 4,756,465 A | 7/1988 | Pranch et al. | |
| 5,148,958 A | 9/1992 | Eskandari et al. | |
| 5,739,499 A * | 4/1998 | Suzio et al. | 219/90 |
| 6,006,133 A | 12/1999 | Lessar et al. | |
| 6,009,348 A | 12/1999 | Rorvick et al. | |
| 6,032,075 A | 2/2000 | Pignato et al. | |
| 6,534,194 B2 | 3/2003 | Weihs et al. | |
| 6,687,118 B1 | 2/2004 | O'Phelan et al. | |
| 6,881,232 B2 | 4/2005 | O'Phelan et al. | |
| 8,038,048 B2 | 10/2011 | Nielsen et al. | |
| 2003/0199940 A1 | 10/2003 | Nyberg | |
| 2004/0114311 A1 | 6/2004 | O'Phelan et al. | |
| 2004/0147960 A1 | 7/2004 | O'Phelan et al. | |
| 2007/0068997 A1 | 3/2007 | Nielsen et al. | |

FOREIGN PATENT DOCUMENTS

JP    10052766    2/1998

* cited by examiner

*Primary Examiner* — Roy King
*Assistant Examiner* — Michael Aboagye
(74) *Attorney, Agent, or Firm* — Carol F. Barry

(57) ABSTRACT

A cold weld is formed in a multilayer-material. A first pin is coupled to a first block. A second pin is coupled to a second block. The multilayer material is disposed between the first pin and the second pin. The first pin opposes the second pin. The multilayer material is held in the XY plane and floats in the Z axis.

20 Claims, 21 Drawing Sheets

COLD WELD

This is a continuation of patent application Ser. No. 11/215,080, filed Aug. 30, 2005, now U.S. Pat. No. 8,038,048, which is incorporated herein by reference.

FIELD OF THE INVENTION

The present invention generally relates to formation of a weld. More specifically, the present invention relates to formation of a cold weld for capacitors.

BACKGROUND OF THE INVENTION

Numerous devices rely on capacitors to charge an electronic component. Capacitors include a cathode subassembly and an anode subassembly. Stacked or interleaved anode subassemblies are typically constructed by aligning multiple anode foil plates within an alignment area located in a material holding block. The material holding block then secures the multiple anode foil plates within an XYZ plane while the plates undergo compression deformation to form a cold weld. A cold weld electrically and mechanically connects the multiple anode foil plates.

Compressive deformation typically involves two opposing hardened cold weld pins that apply load to a region in the multiple plates. Up to two percent of the cold welds are less than optimal due to uneven deformation. For example, such a cold weld may be unevenly deformed along the Z axis. Uneven deformation may compromise mechanical and electrical strength of the weld. It is therefore desirable to overcome limitations associated with conventional cold welding processes.

BRIEF DESCRIPTION OF THE DRAWINGS

The present invention will become more fully understood from the detailed description and the accompanying drawings, wherein.

DETAILED DESCRIPTION

Figure 1A:
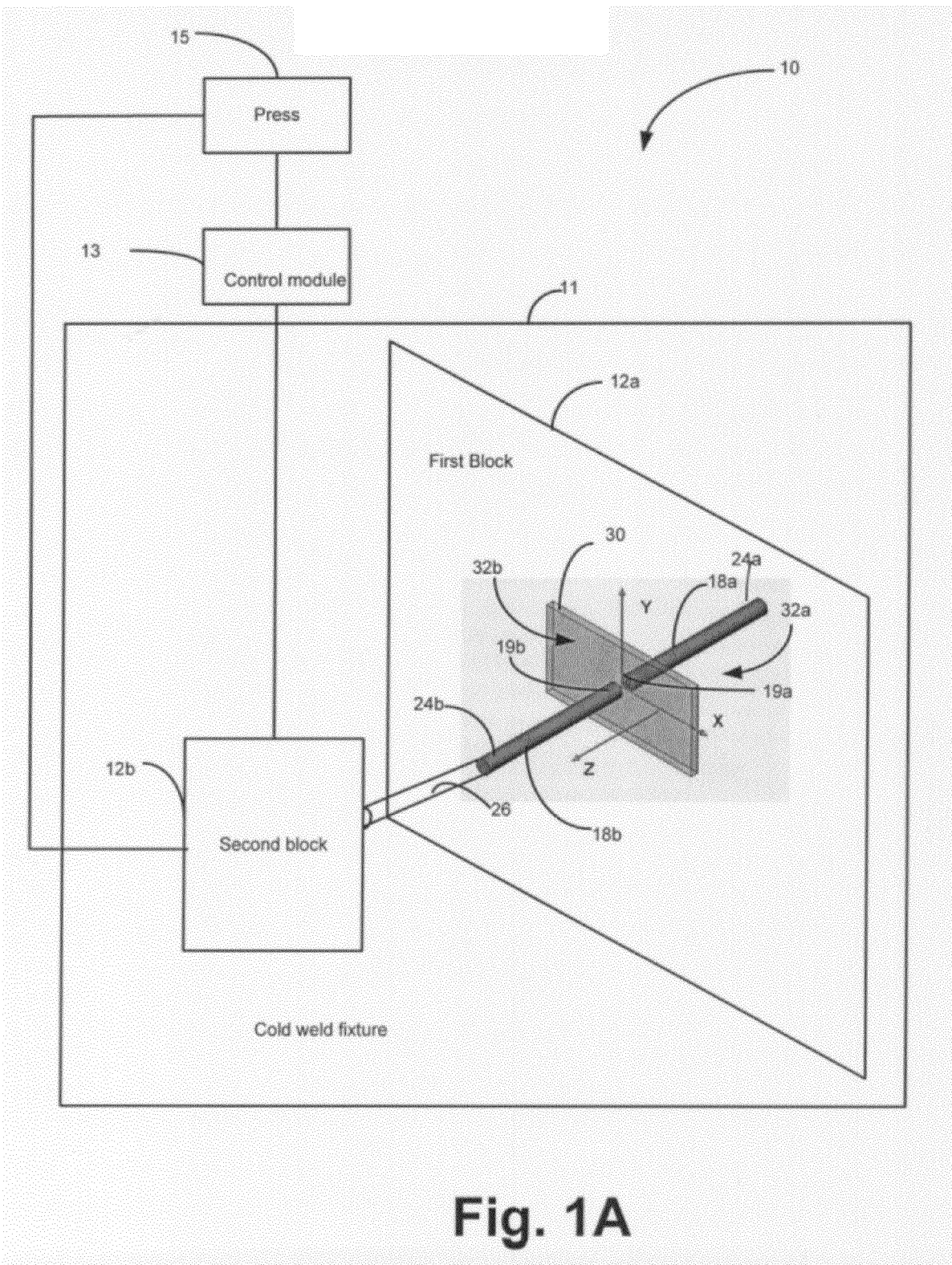
FIG. 1A is a block diagram of an exemplary cold weld system.

The following description is merely exemplary in nature and is in no way intended to limit the invention, its application, or uses. For purposes of clarity, similar reference numbers are used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

The present invention is directed to formation of a cold weld in a multilayered material. A cold weld fixture is configured to secure the material in an XY plane but the material is unsecured along a Z axis. A cold weld is then formed in a portion of the material by compression. This process eliminates or significantly reduces less than optimal cold weld characteristics, such as weakened mechanical and electrical characteristics.

Figure 1B:
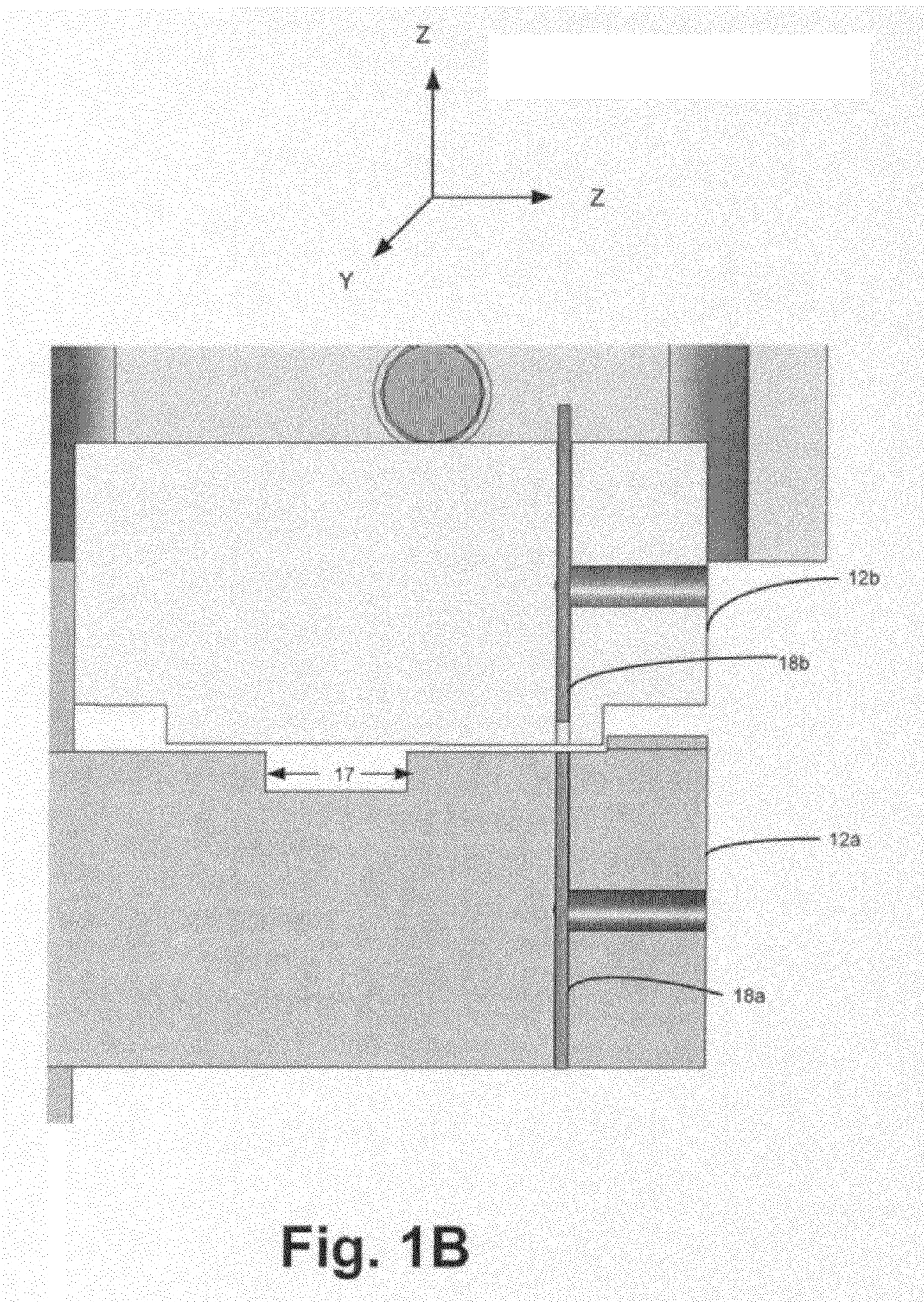
FIG. 1B is a cross-sectional view of an exemplary cold weld system.
Figure 2:
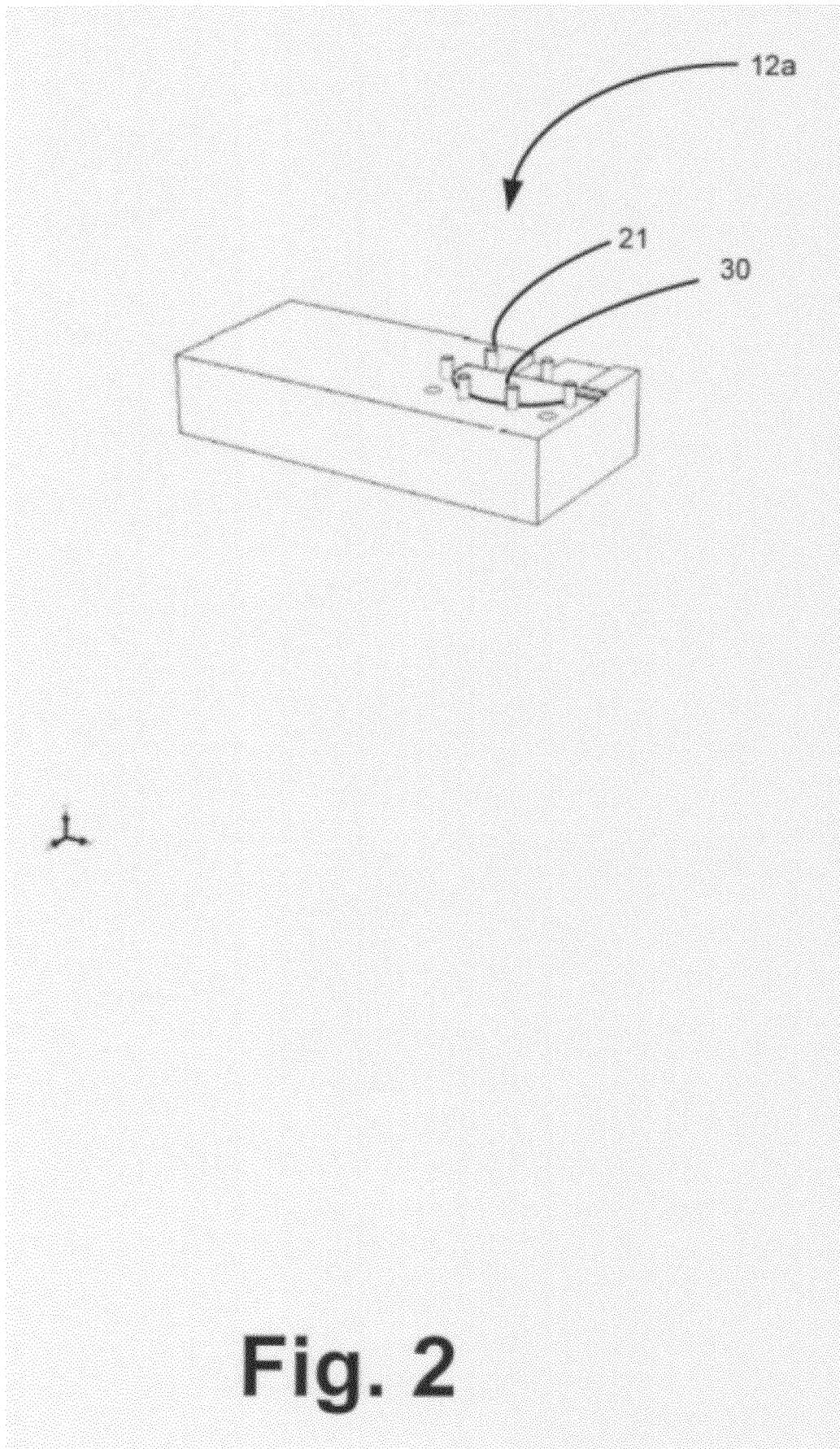
FIG. 2 is a partial top perspective view of a block configured to align multiple layers of a material.

FIGS. 1A-1B depict a cold weld system 10 that forms one or more cold welds in a multilayered material. Cold weld system 10 includes a cold weld fixture 11, a control module 13, and a press 15. Cold weld fixture 11 fixes a multilayered material 30 in a XY plane while allowing material 30 to float along a Z axis during a cold weld operation. Cold weld fixture 11 includes a first block 12a, a second block 12b, a first pin 18a (e.g. a cold weld pin), a second pin 18b, and a multilayered material 30. First block 12a fixes multilayer material 30 (e.g. multiple anode foil plates etc.) in a XY plane. FIG. 2, for example, shows multilayer material 30 seated in alignment region 17 of first block 12a. Alignment region 17 is shaped by a plurality of pins 21 to correspond to the shape of multilayer material 30. Skilled artisans appreciate that numerous other means can be used to stack and align multiple anode foil plates. An example of another stacking method may be seen with respect to U.S. Pat. No. 6,009,348 issued Dec. 28, 1999, and assigned to the assignee of the present invention, the disclosure of which is incorporated by reference, in relevant parts. Once the multiple layers of material 30 are properly aligned, material 30, disposed in first block 12a, may move along the Z axis. Material 30 generally moves in a manner similar to a diving board for a swimming pool.

Figure 3A:
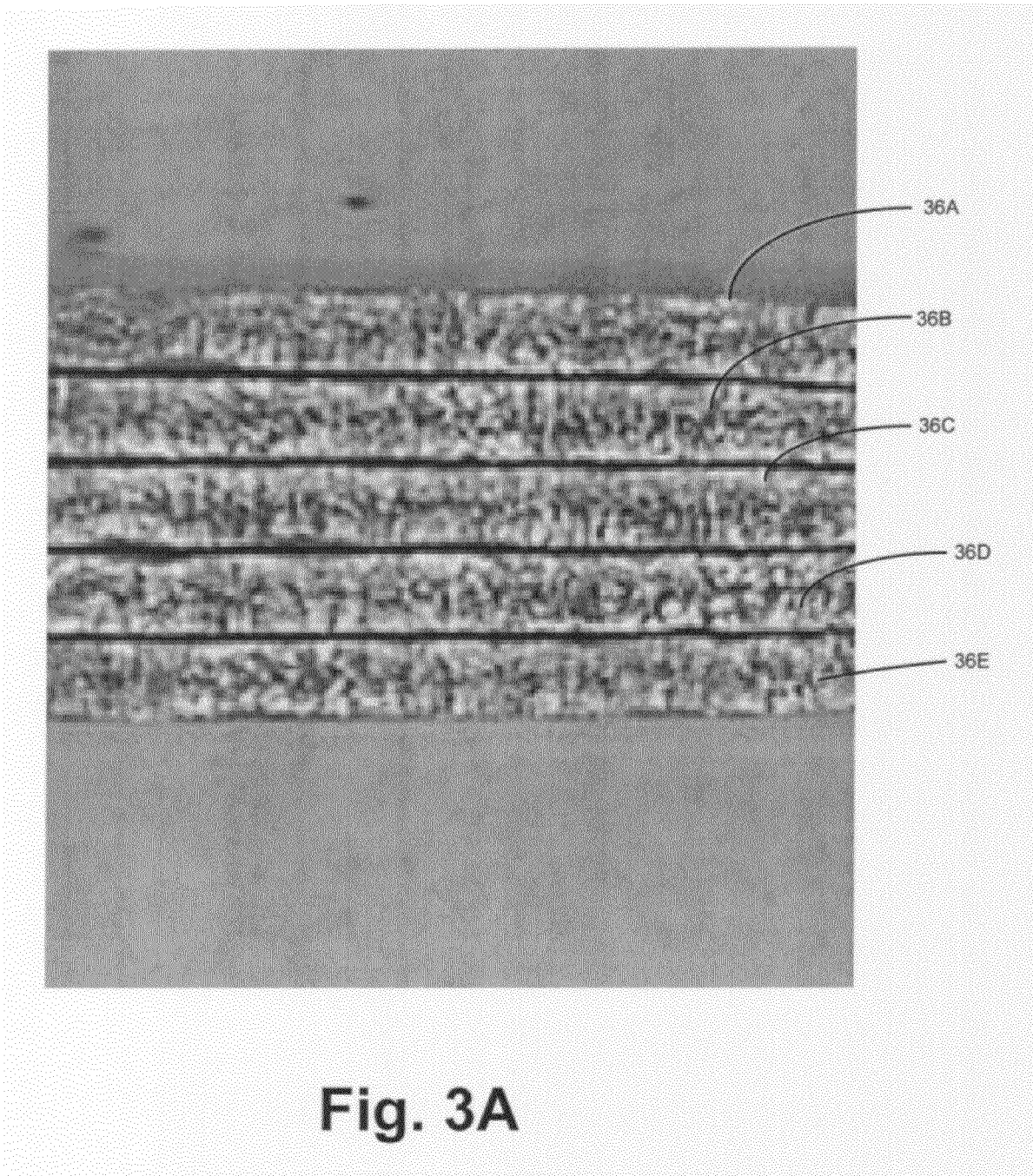
FIG. 3A is a cross-sectional view of stacked material.

Once material 30 is properly seated in alignment region 17 of first block 12a, control module 13 signals press 15 over a conductive fine or wireless means. In response, press 15 pushes slidable post 26 to engage proximal end 24b of second pin 18b. Second pin 18b is comprised of a hardened material (e.g. steel etc.) formed in a cylindrical shape or other suitable shape. A distal end 19b of second pin 18b contacts a region of a second surface 32b of multilayered material 30 at a pressure of about 17 kilopounds per square inch (kpsi) to about 120 kpsi. An exemplary multilayered material 30, depicted in FIG. 3A, comprises more than one layer of metal and/or alloy (e.g. aluminum; etched and formed anode foil, etc.). After compression force is applied to second surface 32b, first surface 32a of material 30 contacts distal end 19a of first pin 18a. In one embodiment, first surface 32a is forced onto a distal end 19a of first pin 18a by compression force from second pin 18b. Distal end 19a is fixed in position by proximal end 24a of second pin 18a being securely held in a stationary position by first block 12a. In another embodiment, first block 12a includes a press (not shown) that pushes a slidable post (not shown) to engage first pin 18a and forces first pin 18a into first surface 32a.

Figure 3B:
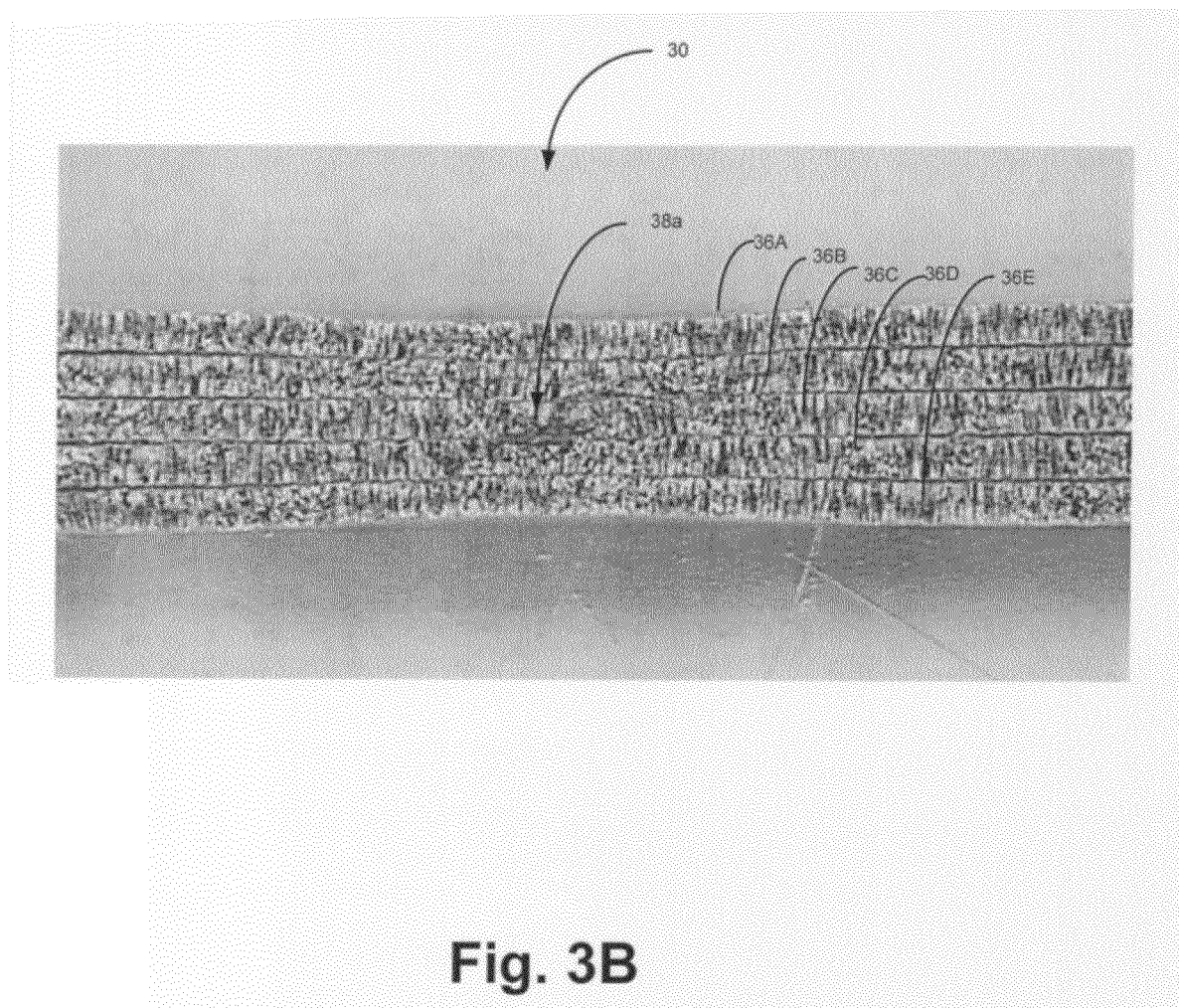
FIG. 3B is a cross-sectional view of an exemplary cold weld in a multilayered material.
Figure 3C:
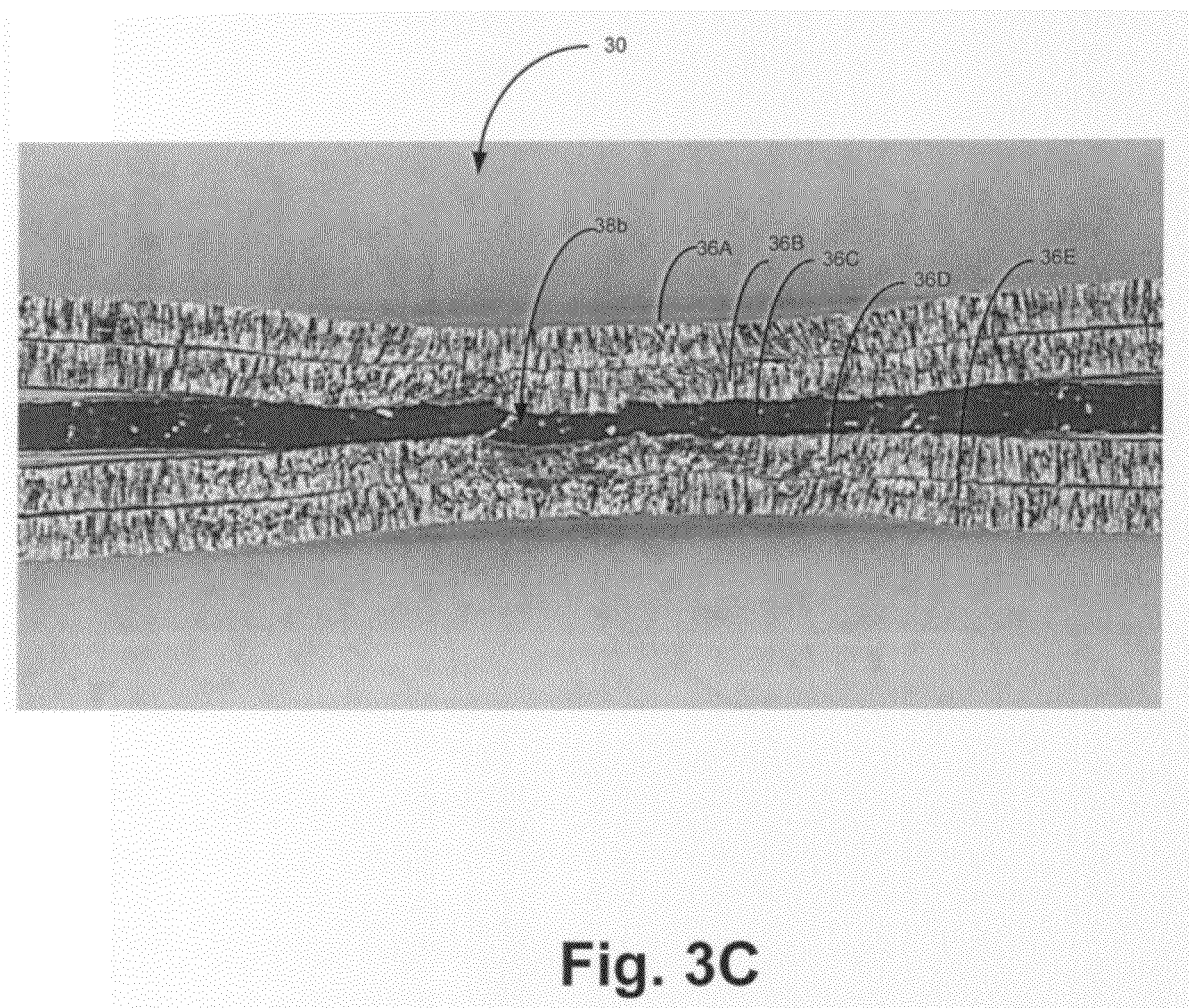
FIG. 3C is a cross-sectional view of another exemplary cold weld in multilayered material.

Substantially even deformation of multilayered material 30 of cold welds 38a, 38b, is depicted in FIGS. 3B-3C. Even deformation is generally created by a process in which a pin presses into a surface of the material until material characteristics makes it easier for the other pin to press into the other surface of material 30. For example, while second pin 18b presses into second surface 32b, multilayered material 30 begins to deform layers 36a-b. At about the same time, first surface 32a of multilayered material 30 is forced onto first pin 18a, which causes deformation in layers 36d-e. Layer 36c is deformed by pressure applied by first pin 18a, second pin 18b, or both first and second pins 18a, 18b. Cold Welds 38a, 38b include layers 36a-b that are about evenly deformed along the Z axis compared to layers 36d-e. By fixing multilayer material 30 in the XY plane and allowing it to float in the Z axis, this process produces higher quality welds and consistently eliminates undesirable characteristics associated with some cold welds. Cold welds 38a, 38b, for example, are centered and the original columnous structure of layers 36a-e substantially remains intact. In contrast, a less than optimal cold weld exhibits mixed material layers where the stacking effect of the original columnous structure has not been used beneficially and may not possess optimal characteristics of cold welds 38a, 38b. Additionally, the mechanical and electrical strength of cold welds 38a, 38b formed by this process resists significant load. Cold welds 38a, 38b are also able to pass about 7 ampere of current within about 6 milliseconds or less. Cold welds 38a, 38b also are able to withstand at least 0.6 to about 3.0 pounds of fame according to a standard pull test without affecting electrical or mechanical properties associated cold welds 38a, 38b. One standard pull-separator test is referred to as the normal pull separator test where normal relates to the angle and the plane. This test is also referred to as the pull to failure test.

Figure 4A:
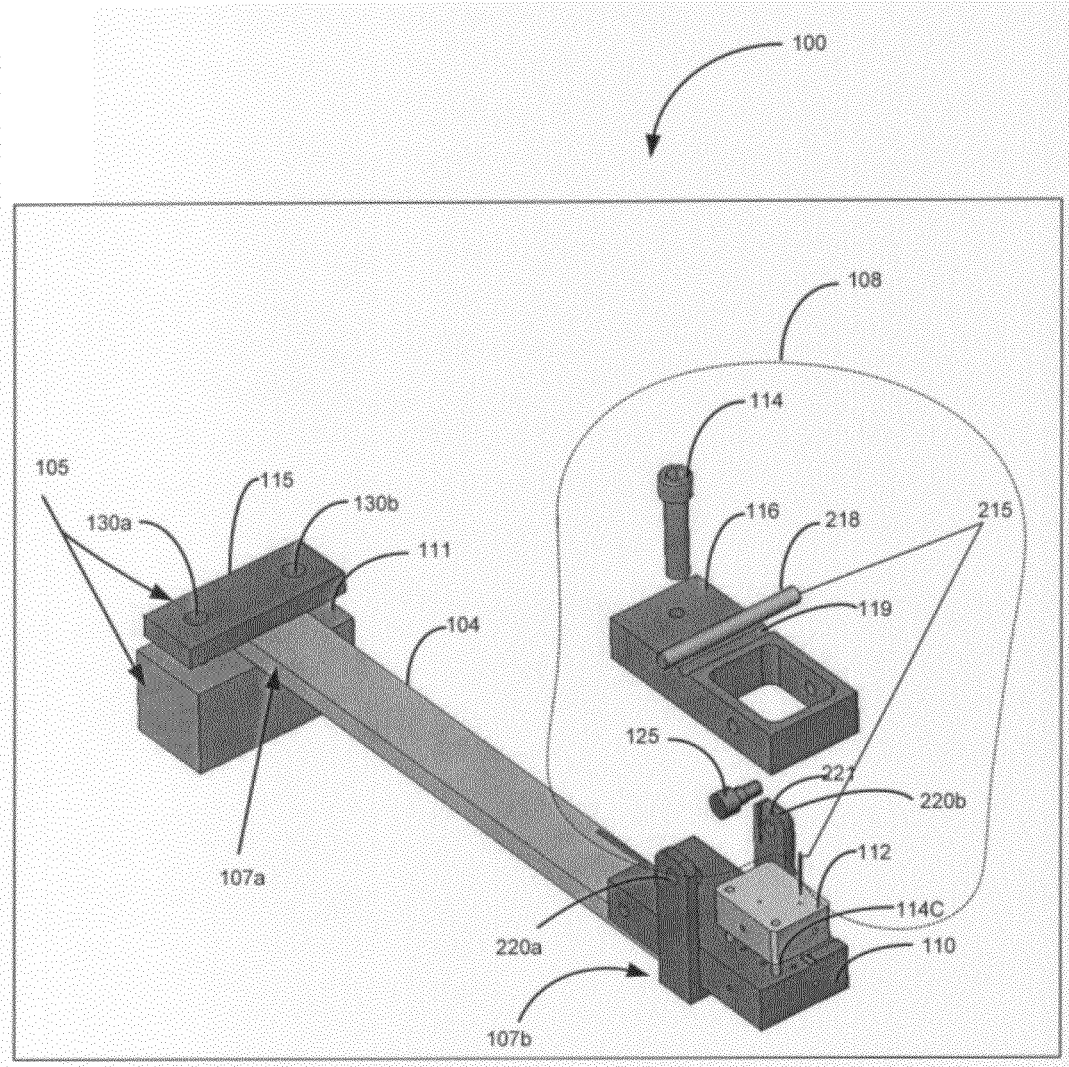
FIG. 4A-4B are partial top perspective views of a cold weld fixture.
Figure 4B:
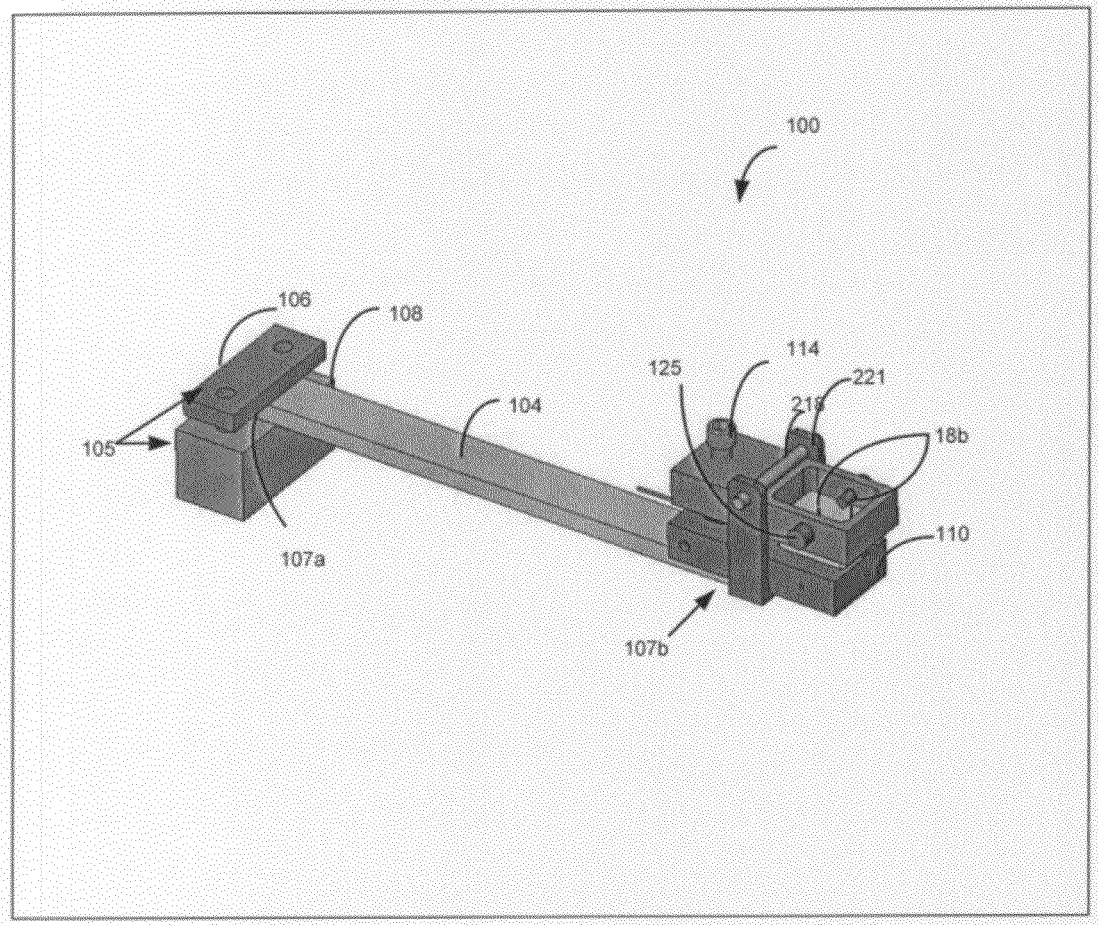

FIGS. 4A-4B depict another embodiment of an exemplary cold weld fixture 100 for forming a cold weld in material 30. Cold weld fixture 100 includes a cantilever 104, a first clamp 105, and a second clamp 10B. First clamp 105 is coupled to a proximal end 107a and second clamp 108 is coupled to a distal end 107b of cantilever 104. First clamp 105 fixes cantilever 104 to the ground via a fixed and rigid base (not shown). First clamp 105 includes anvil 111 and securing block 115. Anvil 111 remains stationary during formation of a cold weld. Securing block 115, coupled to anvil 111 via connectors 130a, 130b, clamps anvil 111 onto cantilever 104.

Second clamp 108 couples second block 112 to cantilever 104. Second clamp 108 includes first block 110, stack load frame 116, stack load connector 114, preloading hinge assembly 215, and connector 125. First block 110 and second block 112 are aligned through a plurality of alignments posts 114C. Preloading hinge assembly 215 supports first block 110, second block 112, and stack load frame 116. Preloading hinge assembly 215 includes rod 218 and hinge 221. Rod 218, inserted through holes 220a and 220b of hinge 221, rests against recessed region 119 disposed in hinge 221. Stack load frame 116 is connected to first block 110 via stack load connector 114. Connector 125 is coupled to stack loadframe 116 and to second block 112 to ensure stability of second block 112. In this embodiment, material 30 is securely held in the XY plane by cold weld fixture 100 while material 30 floats in the Z axis.

Figure 5A:
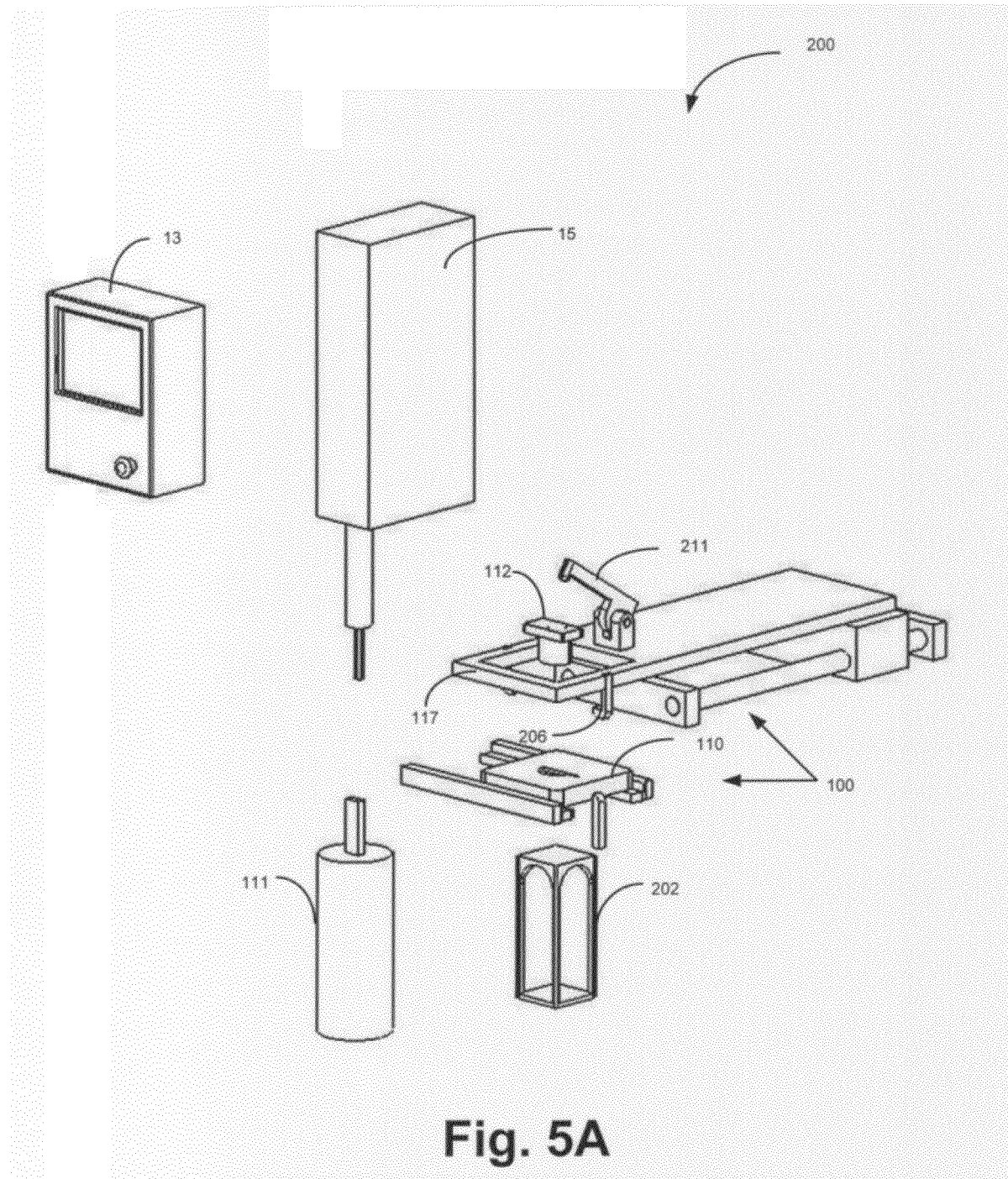
FIGS. 5A-5J are perspective views of a cold weld system that utilizes a reconstructed for automation cold weld fixture depicted in FIGS. 4A-4B.
Figure 5B:
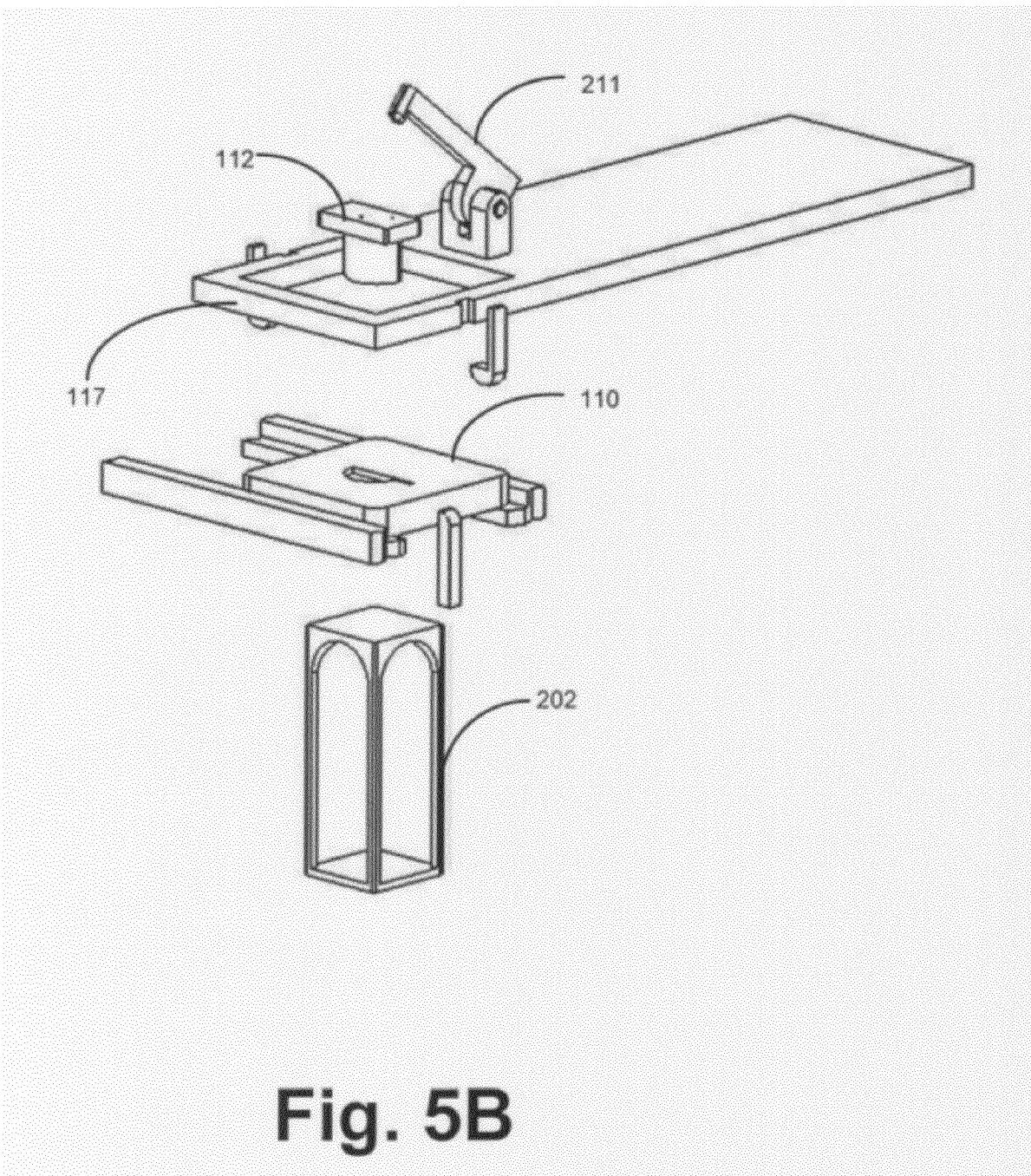
Figure 5C:
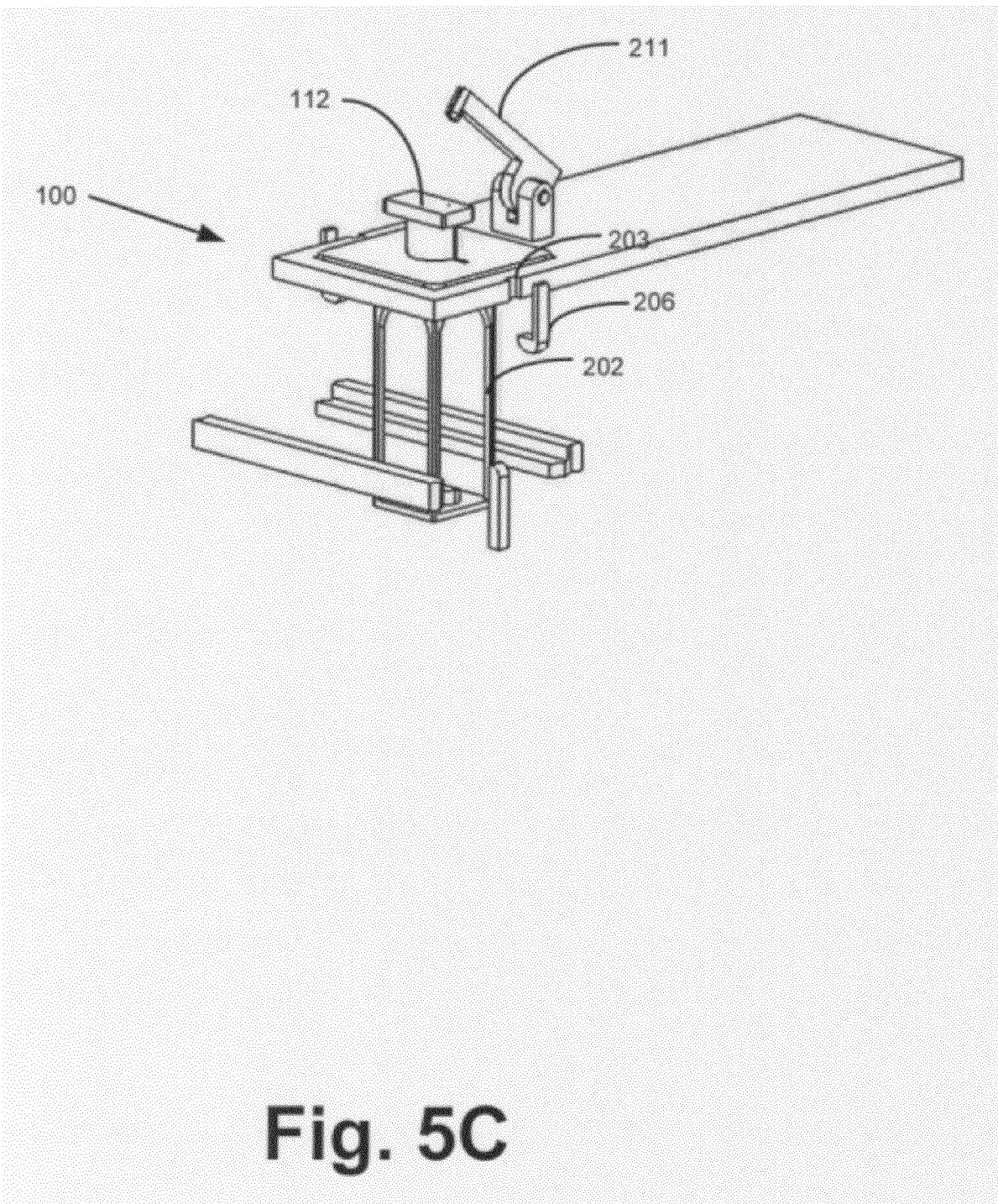
Figure 5D:
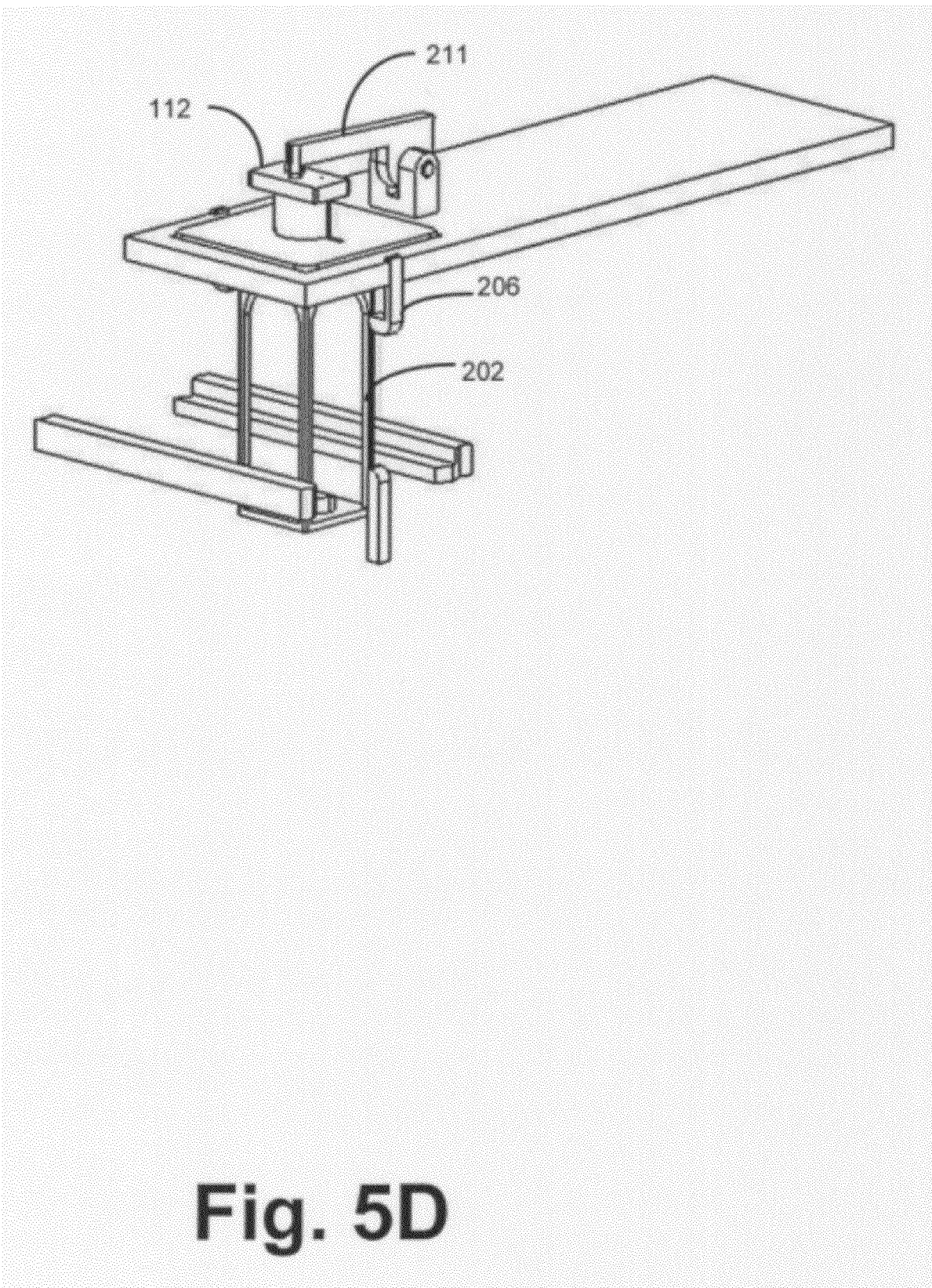
Figure 5E:
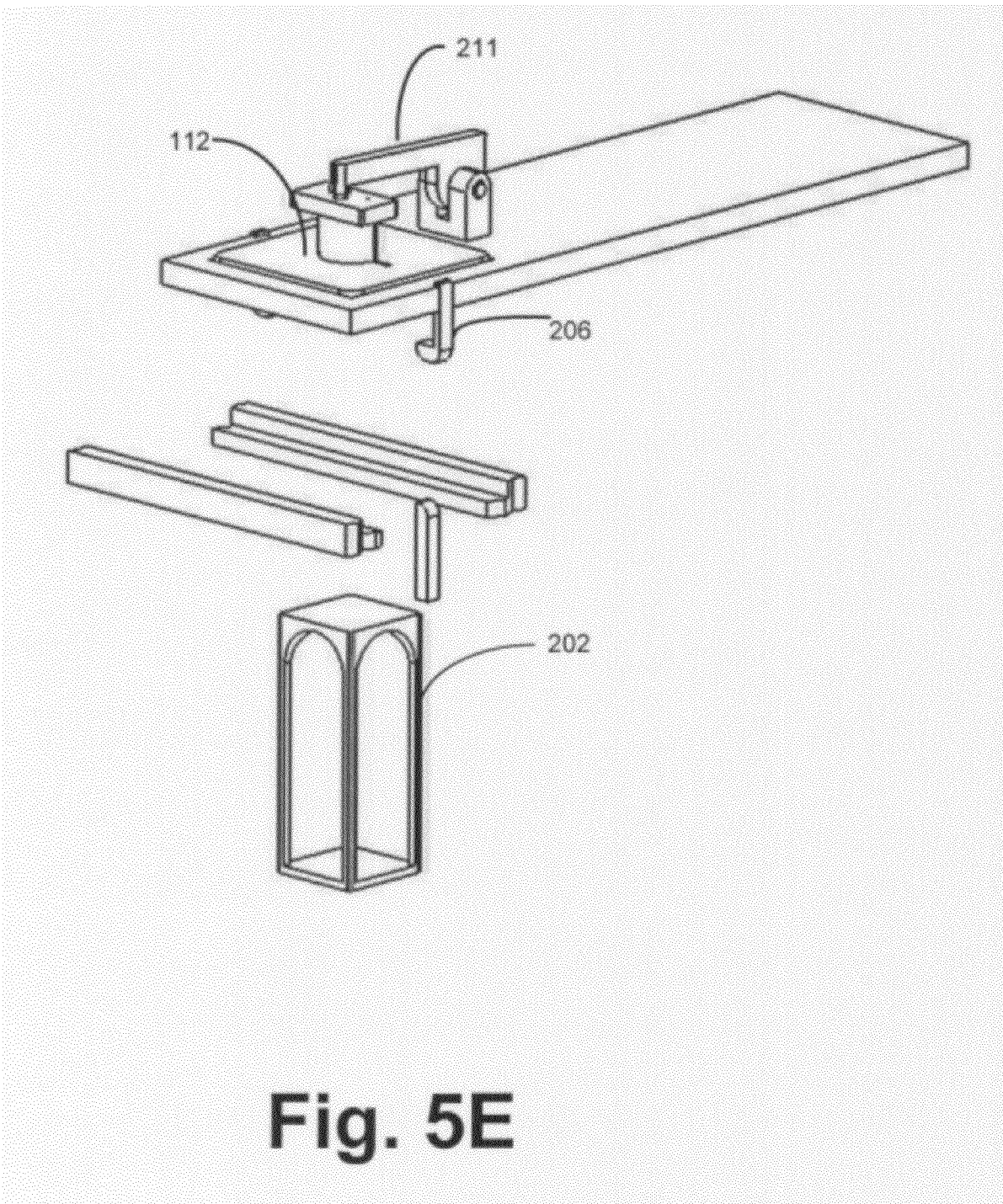
Figure 5F:
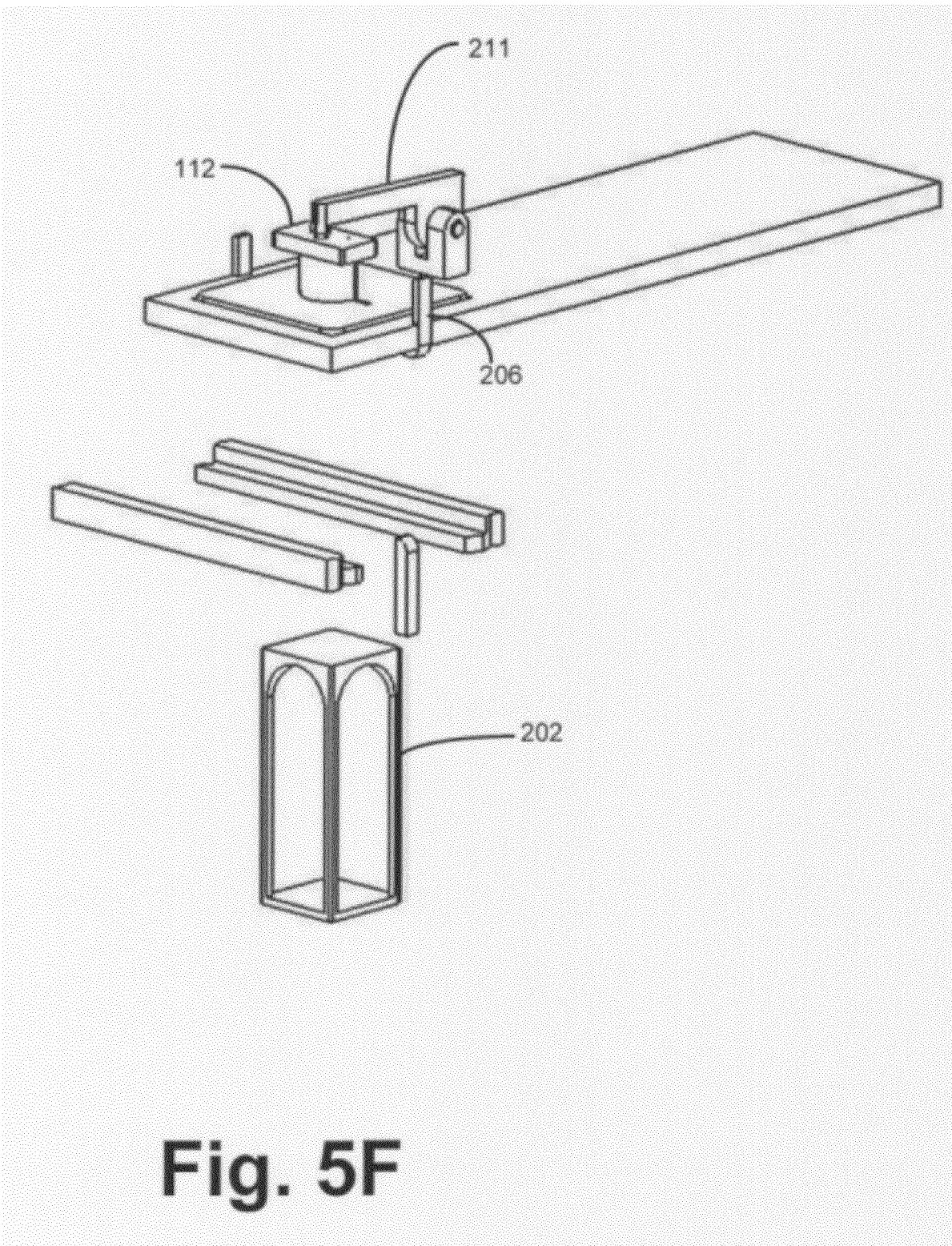
Figure 5G:
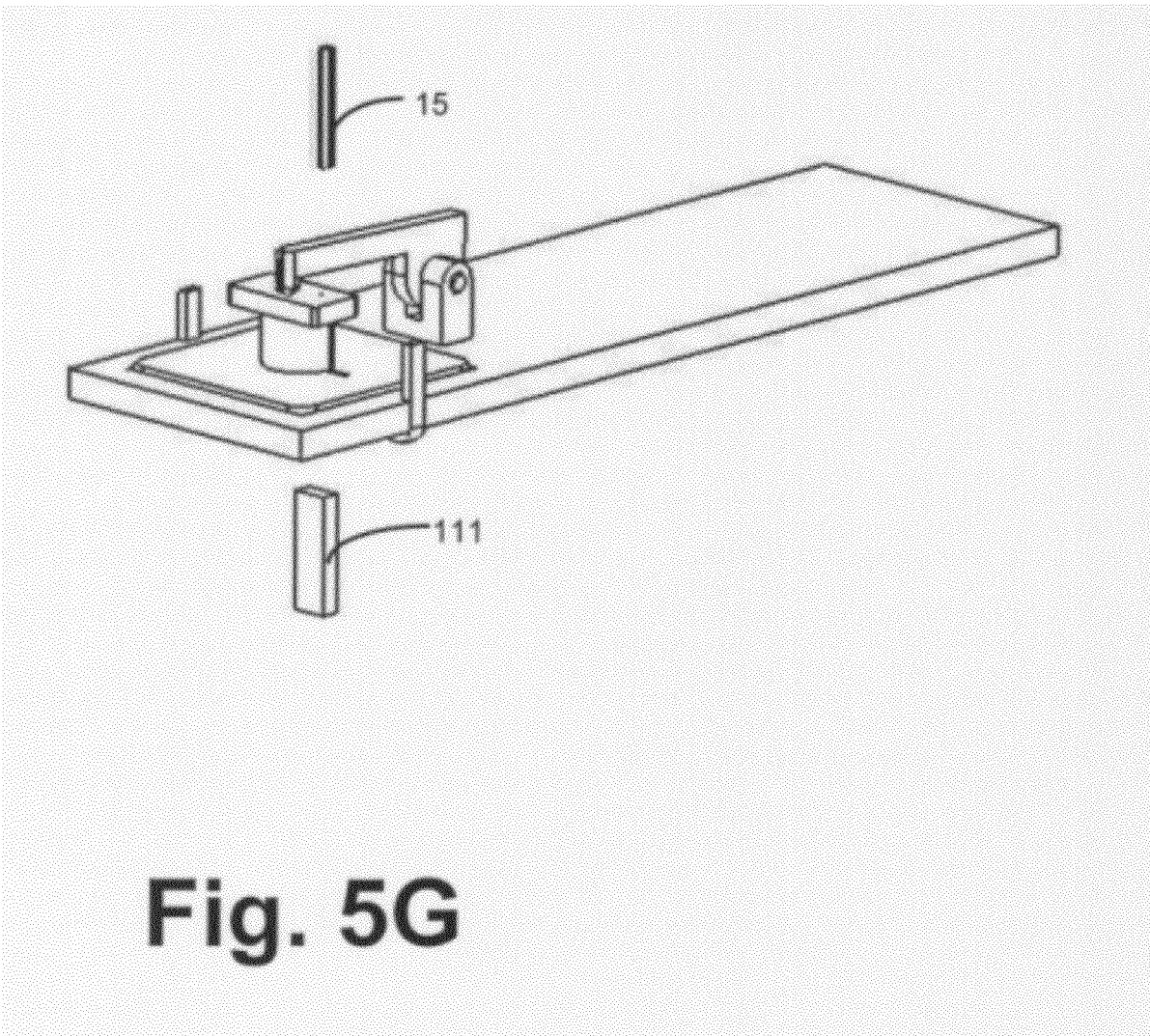
Figure 5H:
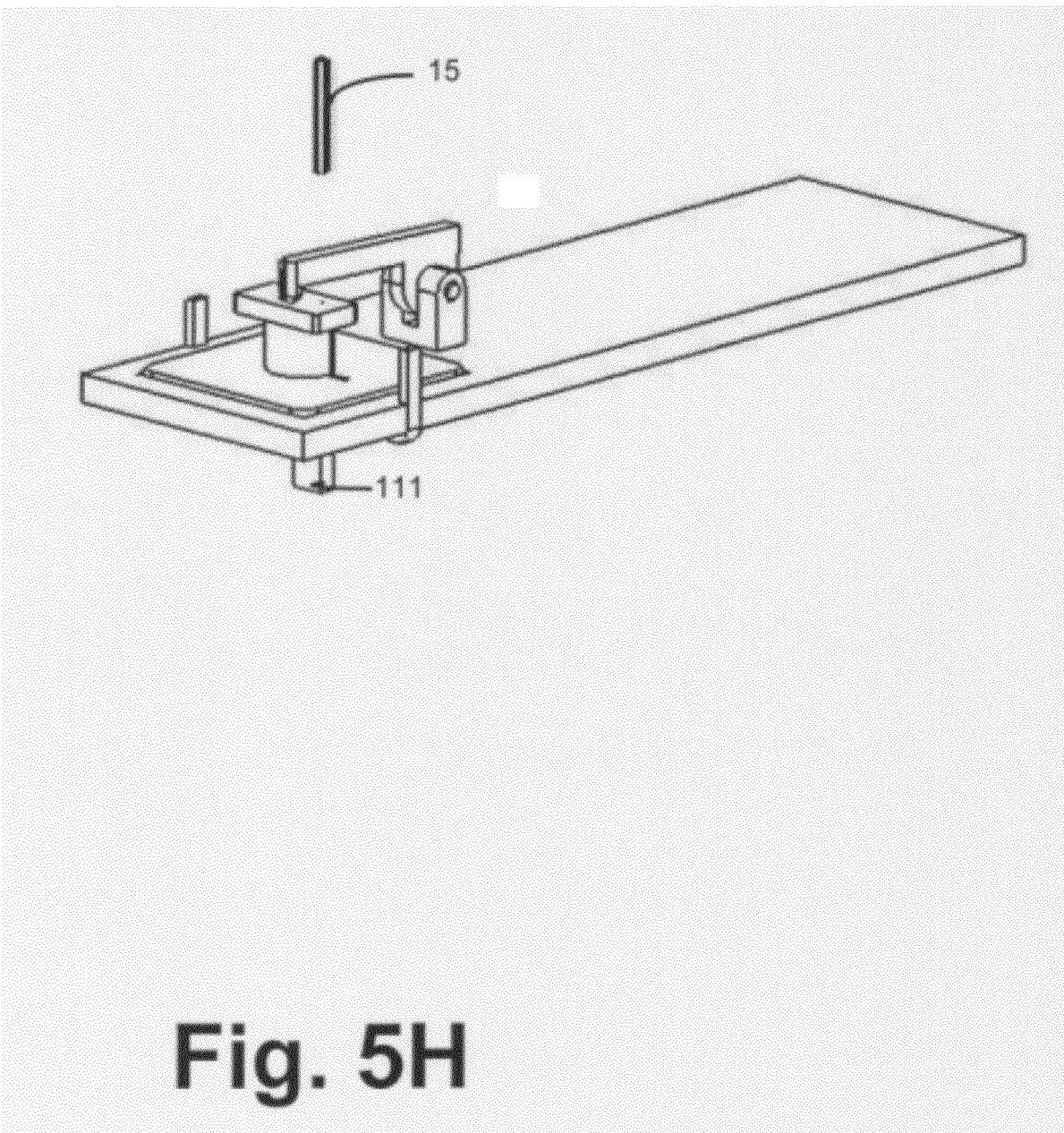
Figure 5I:
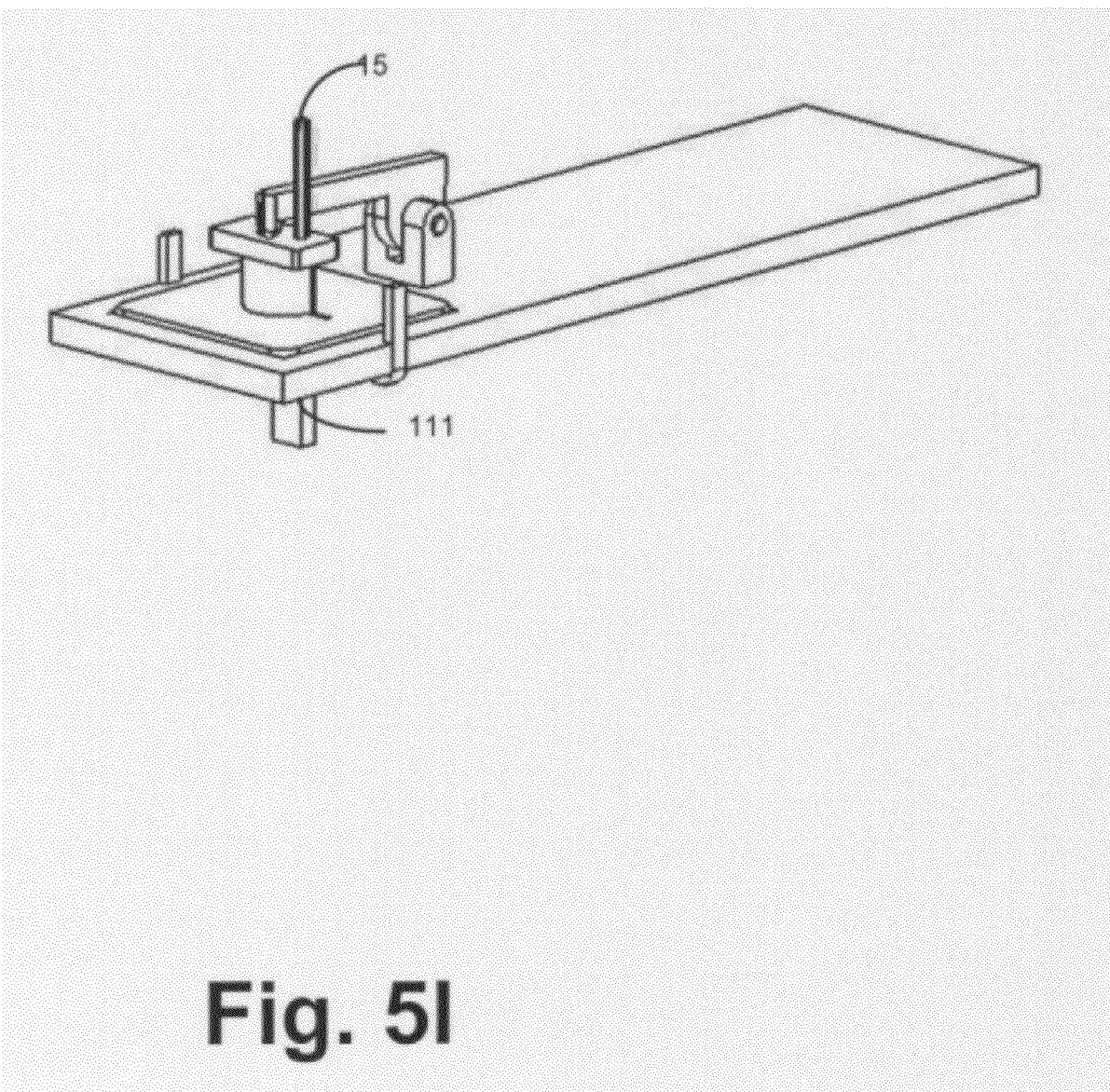
Figure 5J:
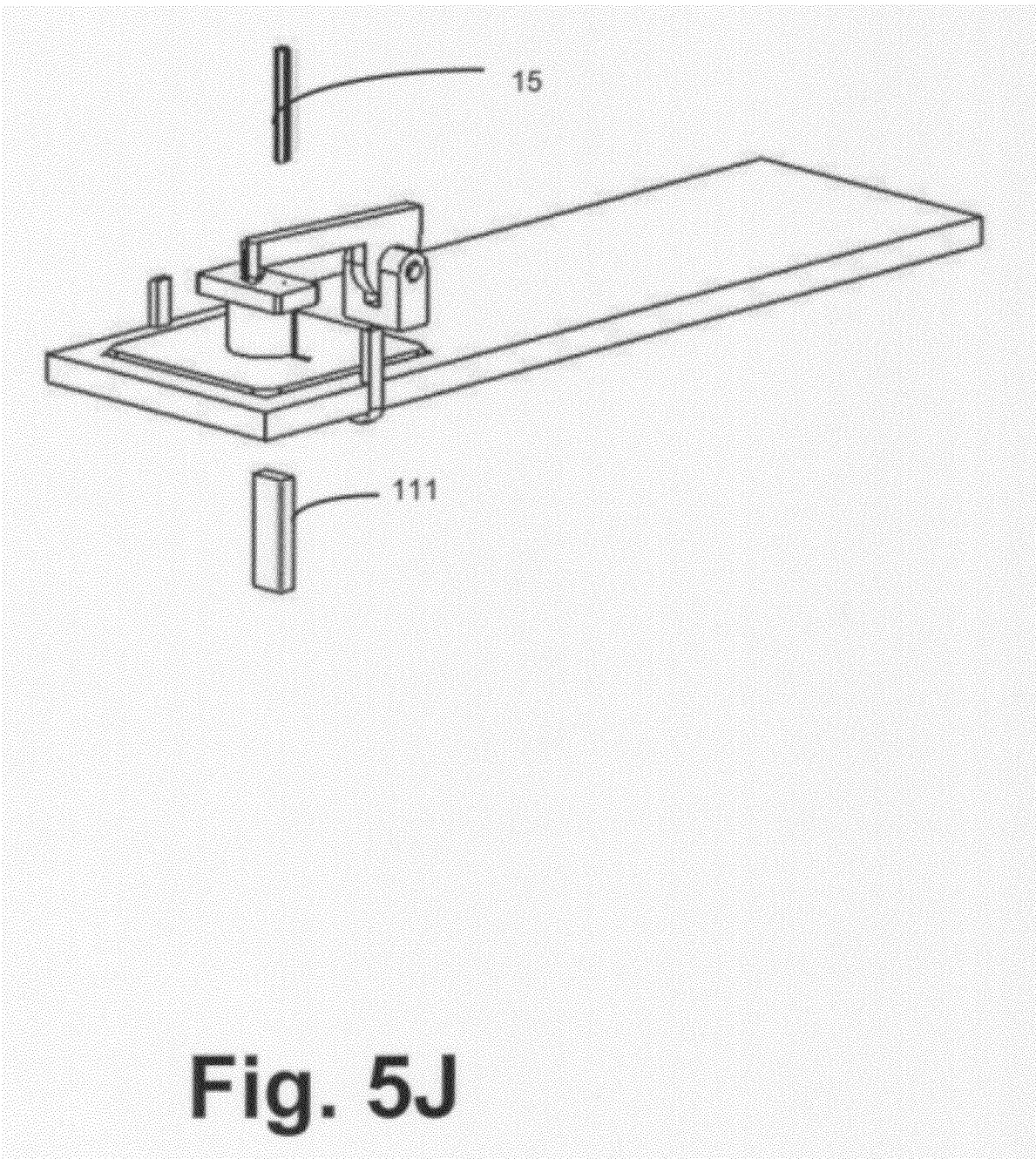

FIGS. 5A-5J illustrate a method to operate a cold weld system 200 utilizing cold weld fixture 100 depicted in FIGS. 4A-4B. Certain features are not described to avoid obscuring the claimed invention. Cold weld system 200 includes cold weld fixture 100, control module 13, press 15, lift t 202, fingers 206, and product clamp 211. Multilayered material 30 is stack loaded via stack load frame 116, as previously described. First block 110 of cold weld fixture 100 is positioned over a lift 202 through, for example, a conveyor belt (not shown). A distal end 117 of cantilever 104 moves from a back to a front position along a Y axis in order to load first block 110, as shown in FIG. 5B. Referring to FIG. 5C, lift 202 is activated. Activating lift 202 causes lift 202 to contact and to move first block 110 to cantilever 104. First and second blocks 110, 112 are also automatically aligned during activation of lift 202. Referring to FIG. 5D, fingers 206 are engaged to recessed region 203 (shown in FIG. 5C) of first block 110. As illustrated in FIG. 5E, product clamp 211 is engaged and contacts second block 210. FIG. 5F depicts retraction of lift 202. Clamps 206 are engaged. These actions cause first block 110 to clamp to cantilever 104. FIG. 5G shows first block 110 positioned to perform a cold weld operation. FIG. 5I illustrates anvil 111 in a raised position. Second pin 18b contacts an area on top of first surface 36a of material 30. Actuation of press 15 causes at least one of pins 18a, 18b to press into a region of multilayered material 30. Material 30 presses into the other pin 18a, 18b thereby forming a cold weld. FIG. 5J depicts press 15 and anvil 111 in retracted positions after formation of at least one cold weld.

Figure 6A:
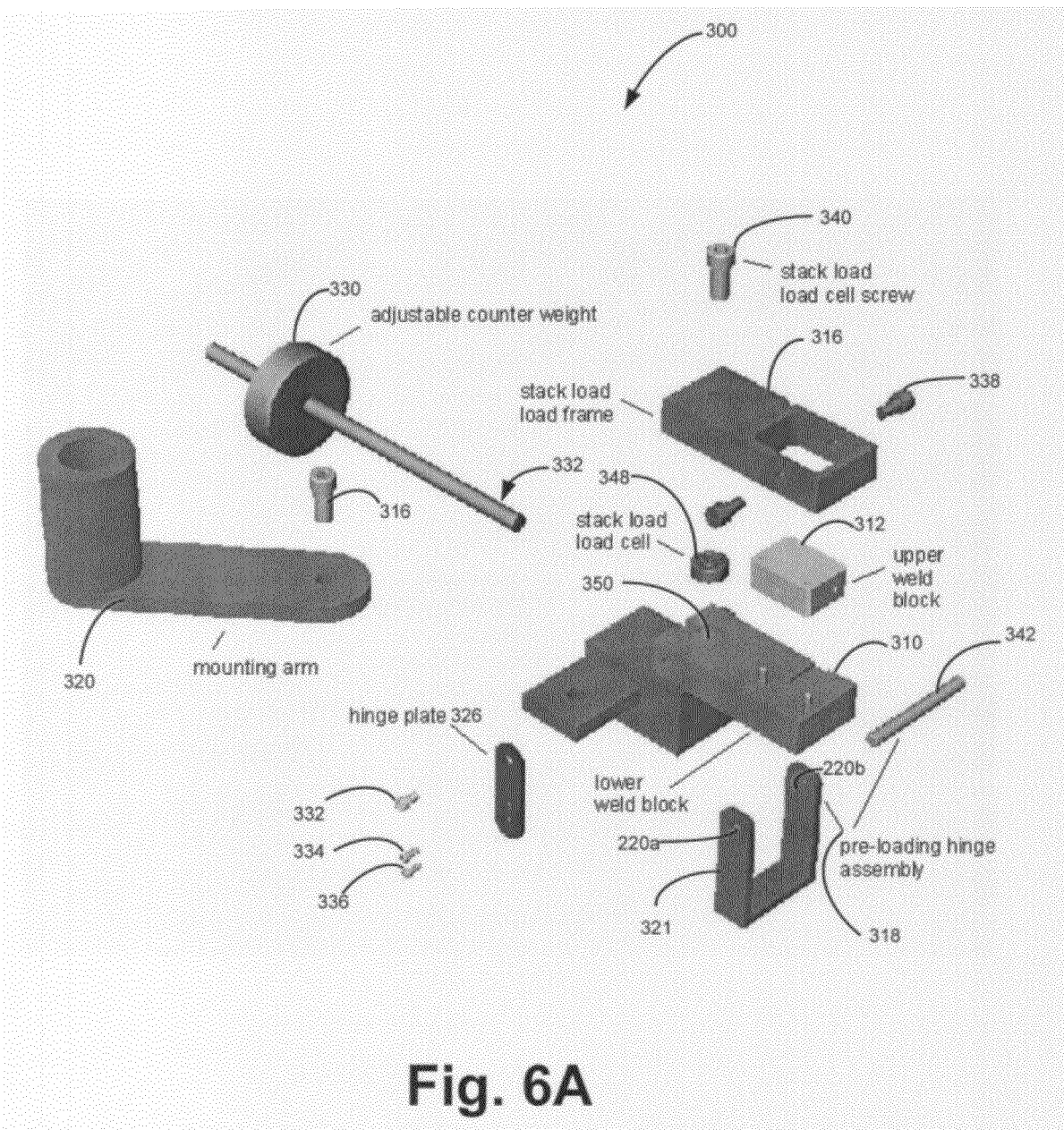
FIG. 6A-6B are top perspective views of yet another cold weld fixture.
Figure 6B:
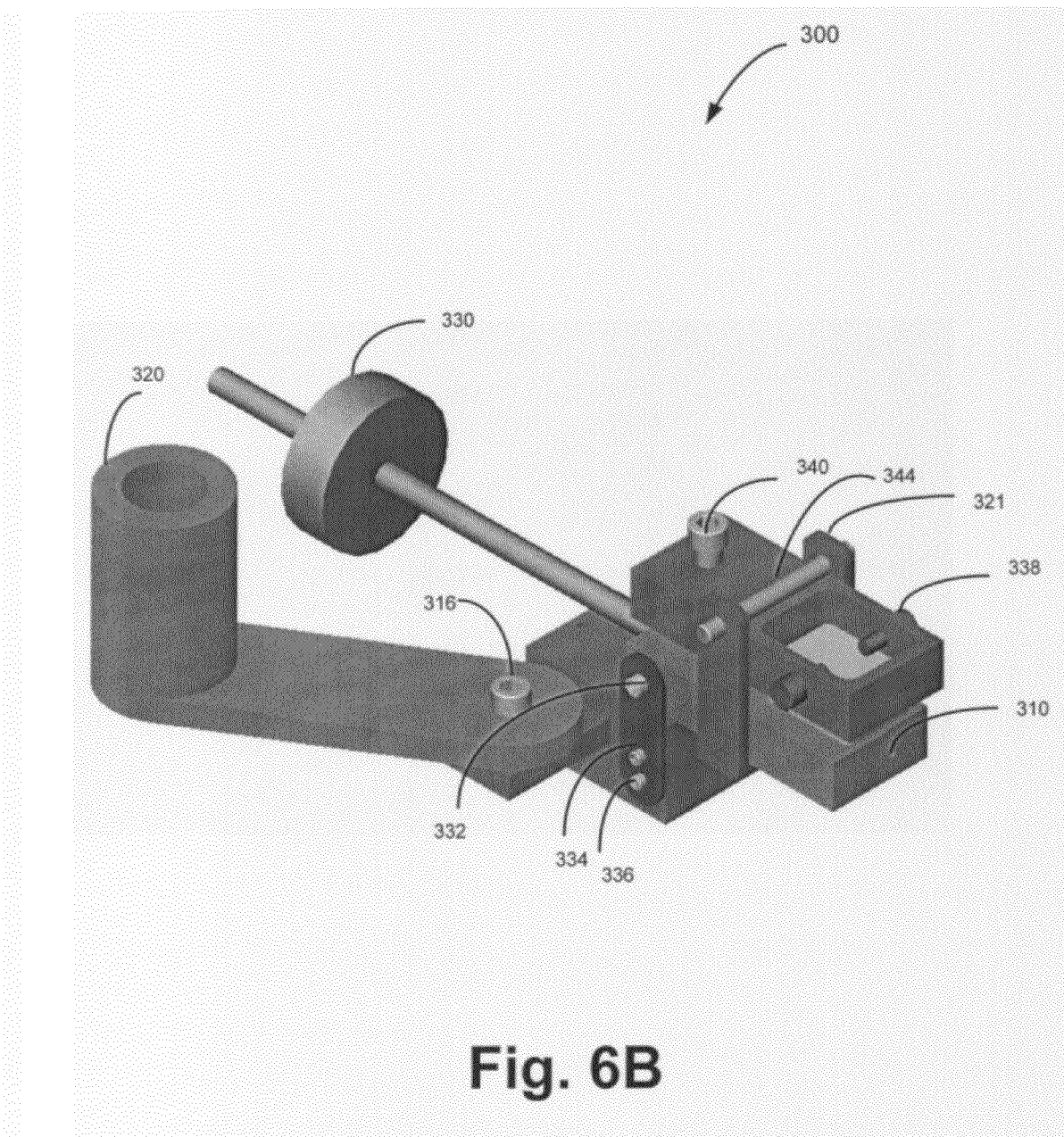

FIGS. 6A-6B depict yet another embodiment of cold weld fixture 300 configured to form cold weld 38 while material 30 is fixed in the XY plane but floats along the Z axis. Cold weld fixture 300 includes first and second weld blocks 310, 312, stack load frame 316, preload assembly 318, mounting arm 320, and counter weight 330. Preload assembly 318 includes hinge 321 and rod 342.

Cold weld fixture 300 may be assembled in many ways. Material 30 is stacked into an alignment region (not shown) of first block 310. Counter weight 330, which includes a threaded rod 332, is screwed into first block 310. Stack load cell, configured to determine the preload weight (e.g. product clamp load etc.), is inserted into recessed region 350. The preload weight ranges from about 25 to about 400 pounds. Hinge 321 is coupled to first and second blocks 310, 312, and stack load frame 316. Stack load connector 340 is initially loosely connected to stack load frame 316. Rod 342 is then slid into holes 220a, 220b. Mounting arm 320 is coupled to lower block 310 via connector 316. Hinge plate 326 is connected to lower plate 310 via a plurality of connectors 332, 334, 336. Stack load connector 340 is then tightly screwed down to stack load frame 316 until an appropriate preload weight is attained as indicated by stack load cell 348. An appropriate preload weight is determined to minimize or eliminate a volcanic edge that may appear around a less than optimal cold weld. Cold weld fixture 300 is then coupled to an anvil, fixed to the ground, which ensures cold weld fixture 300 is in a stationary position. Additionally, cold weld fixture 300 is also coupled to press 15 and optionally connected to control module 13. While cold weld fixture 300 is considered rigid, counter weight 330 is able to pivot about connector 332. Press 15 applies pressure to second block 312, which in turn forces second pin lab into second surface 32b of material 30. While second pin 18b presses into second surface 32b, counter weight 330 pivots about connector 332, thereby causing first pin 18a, held in a stationary position by first block 310, to press into first surface 32a of material 30. Skilled artisans understand that the characteristics of multilayer material 30 governs the manner in which counter weight 330 pivots about connector 332.

Figure 7:
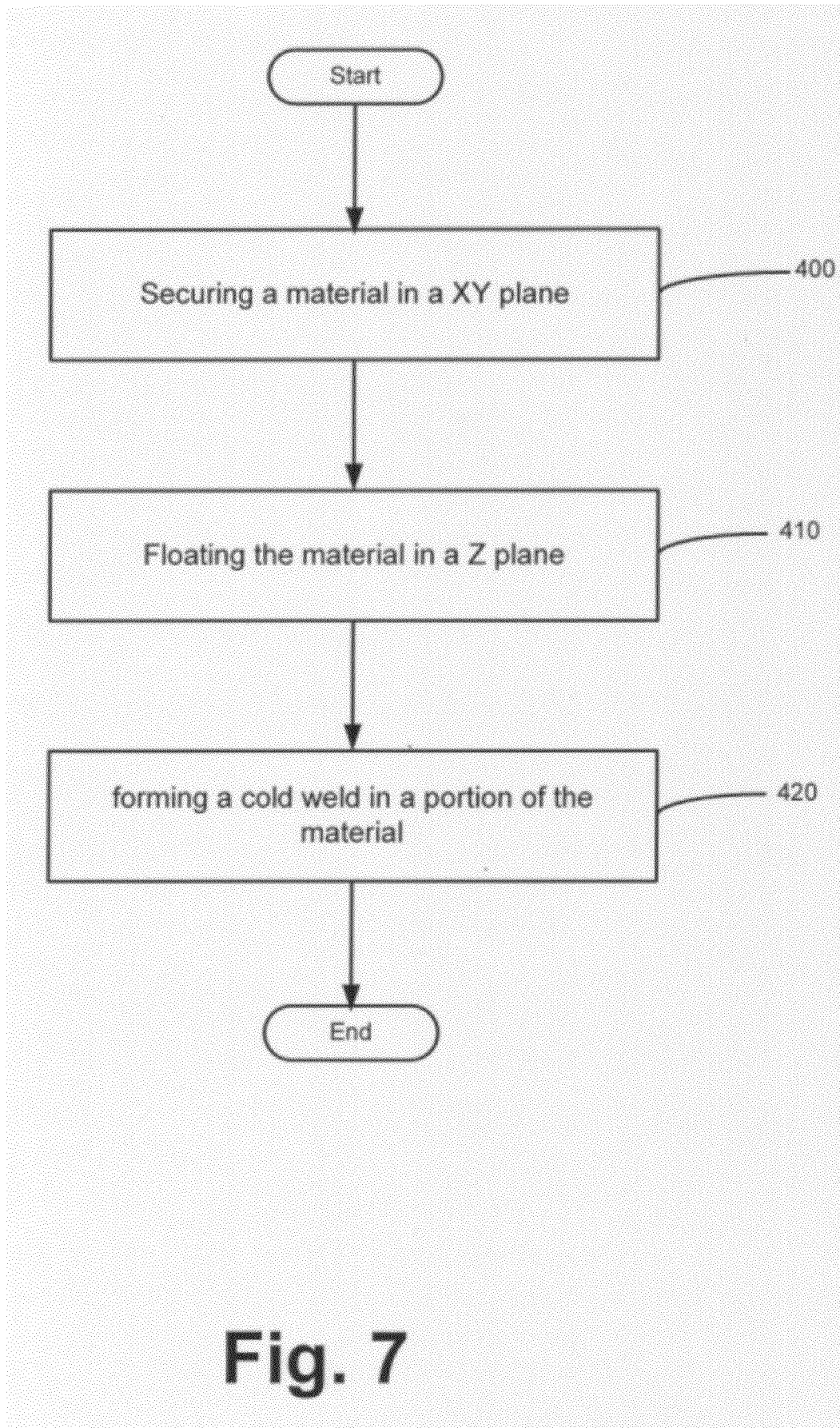
FIG. 7 is a flow diagram of a method to form a cold weld.

FIG. 7 is a flow diagram of a method to form a cold weld in a multilayered material. At block 400, a material is secured in a XY plane. For example, the material may be clamped in a block that holds the material in a XY plane. At block 410, the material is allowed to float in the Z axis. At block 420, a cold weld is formed in the multilayered material. Cold welds 38a, 38b are formed from about no dwell time to about several seconds.

Skilled artisans appreciate that there are numerous apparatuses or modification to the apparatuses to implement the claimed process. For example, the cold weld fixtures may be configured to secure the material along a different plane (e.g. YZ plane) and allow the material to float along a different axis during a cold welding process. Moreover, the description of the preload weight relative to cold weld fixture 300 is optionally applied to any other embodiment presented herein. Additionally, while the present invention is described as an automatic process, it may also be implemented manually or semi-automatically. Furthermore, while the invention is described relative to a capacitor, the principles of the invention may be applied to other electrochemical cells. For example, cold welding may be used with batteries.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A cold weld apparatus comprising:
   a first block comprising an alignment region configured to secure material in the alignment region in an XY plane;
   a first pin positioned proximate a second surface of the material in the alignment recess; and
   a press coupled to a second pin, the press configured to cause the second pin to press into a first location on a first surface of the material in the alignment recess while the first pin presses into a second location on the second surface of the material;
   wherein the alignment recess of the first block is configured to secure the material in the alignment recess in the XY plane while allowing the material to float along a Z axis before the second pin presses into the material.

2. The apparatus of claim 1, wherein the cold weld is formed between the first and the second locations in the material, the cold weld includes a columnous structure of first and second layers.

3. The apparatus of claim 1, further comprising:
   a cantilever that includes a proximal end and a distal end, the proximal end coupled to an anvil, the distal end coupled to the first block.

4. The apparatus of claim 1, wherein the first pin is coupled to a first pin press configured to force the first pin to press into the second location on the second surface of the material.

5. The apparatus of claim 1, wherein the material comprises a stack of metal and/or metal alloy foil plates.

6. The apparatus of claim 1, wherein the alignment recess is shaped by a plurality of pins.

7. The apparatus of claim 1, wherein the material comprises more than two layers.

8. The apparatus of claim 1, wherein the first pin is held in a stationary position relative to the first block and the second pin.

9. The apparatus of claim 8, wherein the press coupled to the second pin, the alignment recess of the first block, and the first pin are configured to cause the second pin to contact the first surface of the material in the alignment recess before the first pin contacts the second surface of the material.

10. A cold weld apparatus comprising:
    a first block comprising an alignment recess configured to secure multilayered material in the alignment recess in a plane defined by a first axis and a second axis;
    a first pin positioned proximate a first surface of the multilayered material in the alignment recess; and
    a press coupled to a second pin, the press configured to force the second pin to press into a second surface of the multilayered material in the alignment recess;
    wherein the alignment recess of the first block is configured to secure the multilayered material in the plane defined by the first axis and the second axis while allowing the material to float along a third axis before the second pin presses into the multilayered material.

11. The apparatus of claim 10, wherein a cold weld is formed in the multilayered material between the first and the second pins, wherein the cold weld includes a columnous structure in the multilayered material.

12. The apparatus of claim 10, further comprising a cantilever that includes a proximal end and a distal end, the proximal end coupled to an anvil, the distal end coupled to the first block.

13. The apparatus of claim 10, wherein the first pin is coupled to a first pin press configured to force the first pin to press into the first surface of the multilayered material.

14. The apparatus of claim 10, wherein the multilayered material comprises a stack of metal and/or metal alloy foil plates.

15. The apparatus of claim 10, wherein the multilayered material comprises more than two layers.

16. The apparatus of claim 10, wherein the first block comprises an alignment recess is shaped by a plurality of pins.

17. The apparatus of claim 10, wherein the first pin is held in a stationary position relative to the first block and the second pin.

18. The apparatus of claim 17, wherein the press coupled to the second pin, the alignment recess of the first block, and the first pin are configured to cause the second pin to contact the second surface of the multilayered material in the alignment recess before the first pin contacts the first surface of the multilayered material.

19. A cold weld apparatus comprising:
    a cantilever comprising a proximal end attached to a fixed base and a distal end;
    a first block attached to the distal end of the cantilever, wherein the first block comprises an alignment recess configured to secure material in the alignment region in an XY plane;
    a first pin positioned proximate a first surface of material located in the alignment recess; and
    a press coupled to a second pin, the press configured to force the second pin against a second surface of the material in the alignment recess;
    wherein the first pin is held in a stationary position relative to the block and the second pin;
    wherein the alignment region of the block is configured to secure the material in the alignment recess in the XY plane while allowing the material to float along a Z axis before the second pin presses into the material.

20. An apparatus according to claim 19, wherein the press coupled to the second pin, the alignment recess of the block, and the first pin are configured to cause the second pin to contact the second surface of the multilayered material in the alignment recess before the first pin contacts the first surface of the multilayered material.

* * * * *